United States Patent [19]
Turnwald et al.

[11] Patent No.: US 6,209,880 B1
[45] Date of Patent: Apr. 3, 2001

[54] AUGER HOPPER SEAL

[75] Inventors: Dennis J. Turnwald, Kalida; Mark A. Recker, Ottawa; David R. Smith; Michael J. Hilvers, both of Fort Jennings, all of OH (US)

[73] Assignee: Unverferth Manufacturing Company, Inc., Kalida, OH (US)

[*] Notice: Subject to any disclaimer, the term of this patent is extended or adjusted under 35 U.S.C. 154(b) by 0 days.

[21] Appl. No.: 09/329,257

[22] Filed: Jun. 10, 1999

[51] Int. Cl.[7] .................................. B60P 1/40; B60P 1/42
[52] U.S. Cl. ........................ 277/402; 198/671; 414/523
[58] Field of Search ................................ 277/358, 377, 277/379, 404, 407; 460/23, 19; 209/244; 198/550.1, 540; 414/523

[56] References Cited

U.S. PATENT DOCUMENTS

| | | | |
|---|---|---|---|
| 2,507,873 | * | 5/1950 | Ward .................................. 56/473.5 |
| 3,035,682 | * | 5/1962 | Ferch ................................. 198/550.1 |
| 3,265,253 | * | 8/1966 | Niewold .............................. 222/328 |
| 3,342,355 | * | 9/1967 | Lasiter ................................. 414/523 |
| 4,411,581 | * | 10/1983 | Niewold ........................... 414/523 X |
| 4,419,037 | * | 12/1983 | Niewold ........................... 414/523 X |
| 4,963,066 | * | 10/1990 | Boppart ................................ 414/376 |
| 5,110,015 | * | 5/1992 | Kilts ................................. 277/402 X |
| 5,615,990 | * | 4/1997 | Grieshop ......................... 198/550.1 X |
| 5,788,055 | * | 8/1998 | Stewart et al. ......................... 198/671 |
| 5,800,116 | * | 9/1998 | Smith et al. ........................... 414/523 |
| 5,876,176 | * | 3/1999 | Smith et al. ........................... 414/523 |
| 6,017,182 | * | 1/2000 | Grieshop ......................... 198/550.1 X |

* cited by examiner

Primary Examiner—Terry Lee Melius
Assistant Examiner—Robert G. Santos
(74) Attorney, Agent, or Firm—Rothwell, Figg, Ernst & Manbeck

(57) ABSTRACT

An auger hopper seal for a pivotable auger is provided according to the invention. The auger hopper seal includes a hopper for a pivotable auger at an intake end of the auger, the hopper having a rear wall located underneath a storage tank, side walls extending from underneath the storage tank, and a front wall positioned away from the storage tank, the hopper being located below a discharge opening on the storage tank and having a hinged connection to the storage tank, wherein the hopper may be pivoted vertically with respect to the storage tank, a flexible seal attached to the rear wall and the side walls of the hopper and positioned between the hopper and a bottom surface of the storage tank, the flexible seal being capable of being displaced by the bottom surface, and a biasing device mounted on the hopper and contacting the flexible seal and urging the flexible seal into a configuration co-planar with the rear wall of the hopper, wherein the flexible seal is capable of retaining a material contained in the hopper when the auger is elevated to a maximum vertical position.

6 Claims, 7 Drawing Sheets ized by: US 6,209,880 B1

AUGER HOPPER SEAL

BACKGROUND OF THE INVENTION

1. Field of the Invention

The present invention relates to an auger hopper seal for a pivotable auger.

2. Description of the Background Art

Augers are mechanical devices that are commonly used for transporting and handling materials. One such material is grain, but various other materials may be moved by augers, such as fertilizers, foodstuffs, chemicals, granular materials, powders, slurries, etc. An auger moves material through the rotation of a helically-shaped flighting encase in a tube. The material is pushed along the bottom of the tube by the rotating flighting.

Augers are widely used in agriculture for moving and handling grain. One popular application is an auger attached to a movable grain tank mounted to a wagon, truck, harvester, or other wheeled conveyance. The auger may be used to unload the grain tank. In order to make such a device safe and easy to use over roads, the auger may be repositionable so that the auger is stored against the grain tank or conveyance in some appropriate manner. In addition, the auger may be repositionable so that the auger output may be directed to a desirable location. This may include a vertical pivot movement wherein the auger may pivot vertically through a range of positions for unloading and for transportation. The auger should not spill or lose any material contents either during repositioning or in any available position of the auger. Of special concern is that no material contents be lost during movement, such as in road travel, of a wagon having an auger in a storable road position.

Accordingly, there remains a need in the art for an auger hopper seal that is capable of being vertically pivoted without a loss of material contents.

SUMMARY OF THE INVENTION

An auger hopper seal for a pivotable auger is provided according to the invention. The auger hopper seal comprises a hopper for a pivotable auger at an intake end of the auger, the hopper having a rear wall located underneath a storage tank, side walls extending from underneath the storage tank, and a front wall positioned away from the storage tank, the hopper being located below a discharge opening on the storage tank and having a hinged connection to the storage tank, wherein the hopper may be pivoted vertically with respect to the storage tank, a flexible seal attached to the rear wall and the side walls of the hopper and positioned between the hopper and a bottom surface of the storage tank, the flexible seal being capable of being displaced by the bottom surface, and a biasing device mounted on the hopper and contacting the flexible seal and urging the flexible seal into a configuration co-planar with the rear wall of the hopper, wherein the flexible seal is capable of retaining a material contained in the hopper when the auger is elevated to a maximum vertical position.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
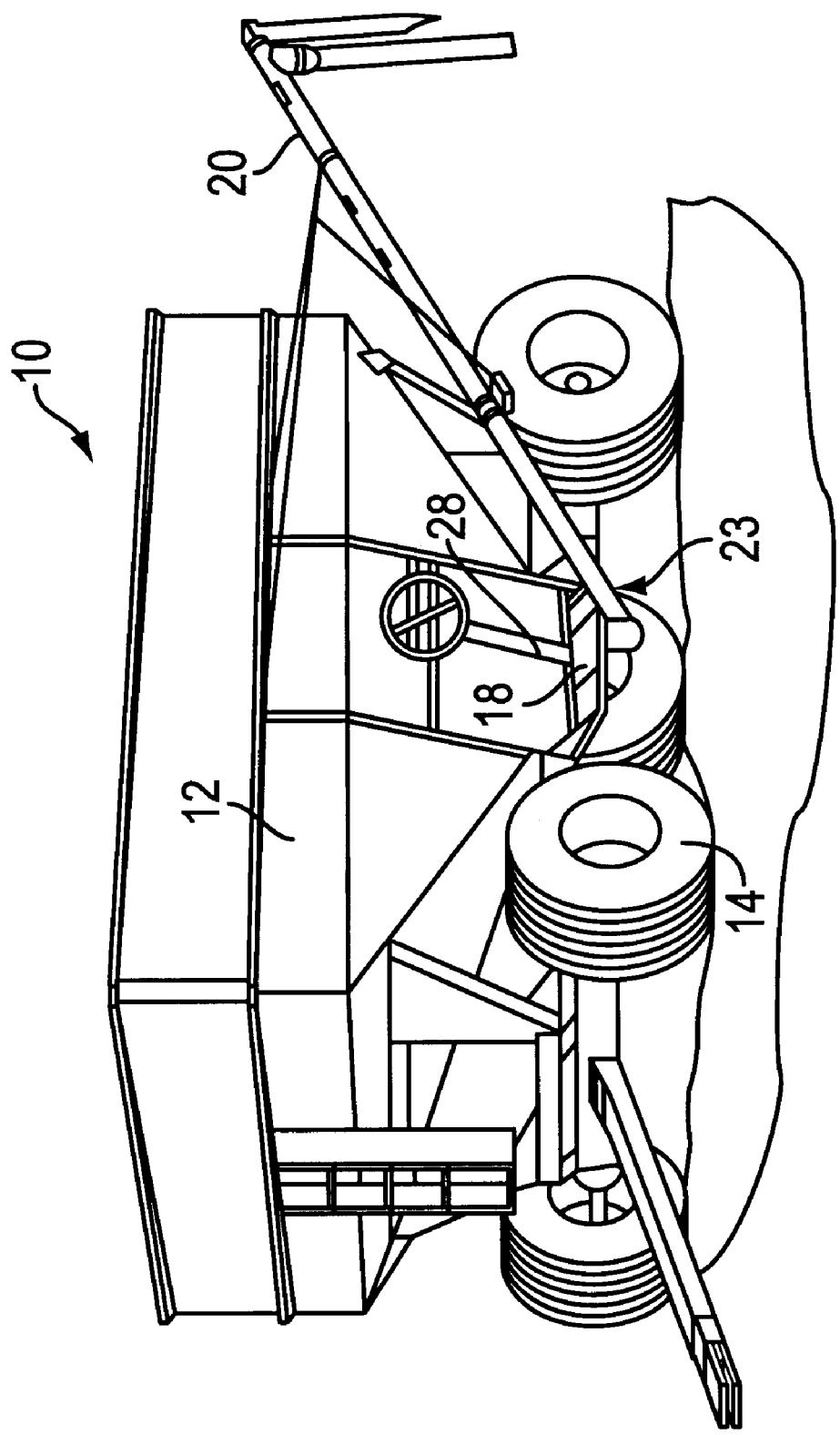
FIG. 1 shows a grain wagon having a vertically pivoting auger and hopper.

FIG. 1 shows a grain wagon 10, having a vertically pivoting auger and hopper. The grain wagon 10 includes a tank 12, a wheeled carriage 14, and an auger 20 that may be repositioned by pivoting the auger 20 in a vertical plane, and optionally (in this embodiment) by rotating the auger 20 in a horizontal plane. As can be seen from the figure, the auger 20 has an intake end 23 connected to a hopper 18. The hopper 18 is positioned below a discharge opening 28 in the tank 12, whereby the contents of the tank 12 may be allowed to flow into the hopper 18 and then into the intake end 23 of the auger 20.

Figure 2:
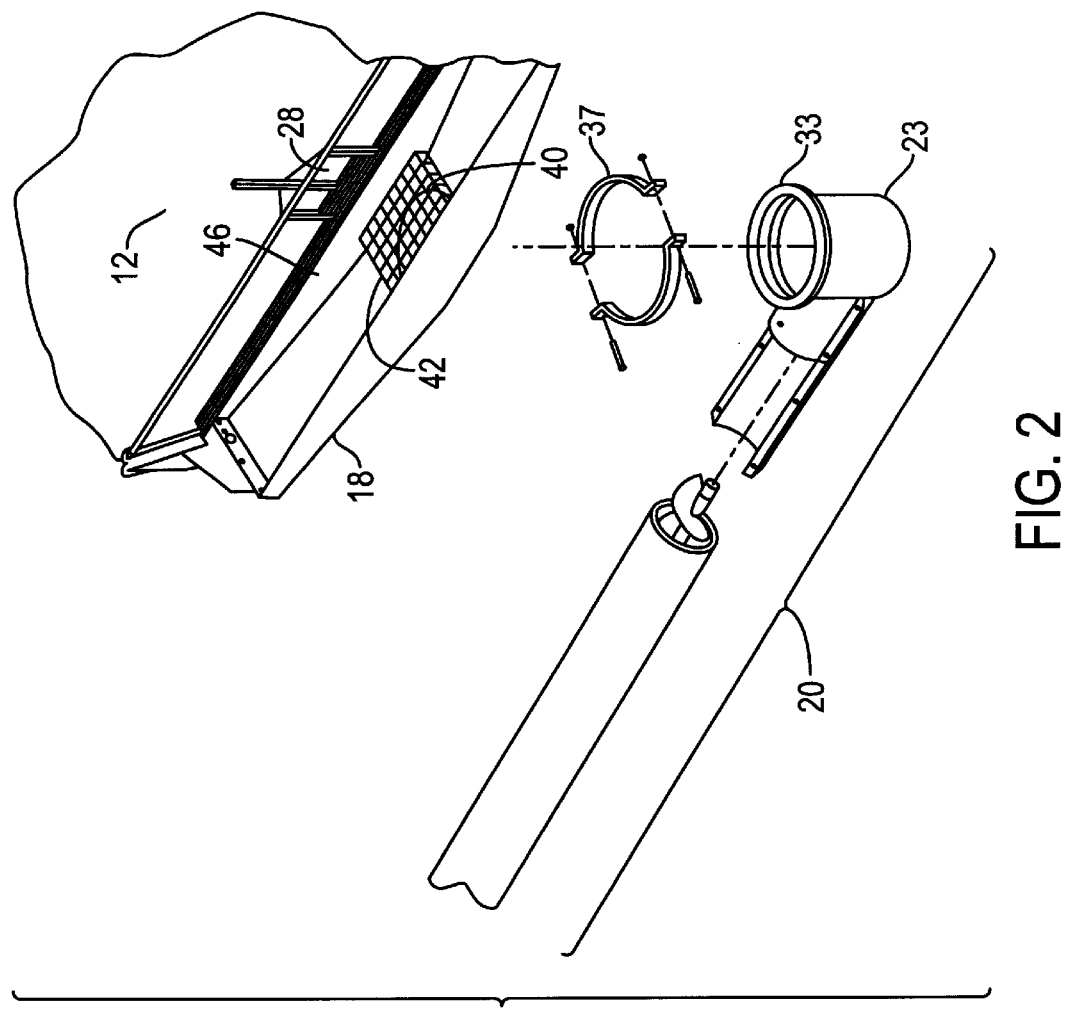
FIG. 2 shows the connection of an intake end of an auger to the hopper.

FIG. 2 shows the detail of one embodiment of the connection of the intake end 23 of the auger 20 with the hopper 18. The intake end 23 includes a intake flange 33, corresponding to a similar hopper flange 34 (not shown, see FIGS. 4B and 5B) on the hopper 18. A clamp ring 37 attaches the intake flange 33 to the hopper flange 34, while yet allowing the auger 20 to rotate with respect to the hopper 18. The hopper 18 includes an opening 40 and an optional grating 42 for partially obstructing the hopper opening 40 for purposes of safety and for prevention of contamination of the material as it flows into the intake end 23 of the auger 20. The rear wall 46 of the hopper is positioned underneath the tank 12, a pair of sidewalls extend from underneath the tank 12, and a front wall is positioned away from the tank 12. Therefore, material flowing out of the discharge opening 28 flows into the hopper 18 and is channeled into the intake end 23 of the auger 20.

Figure 3:
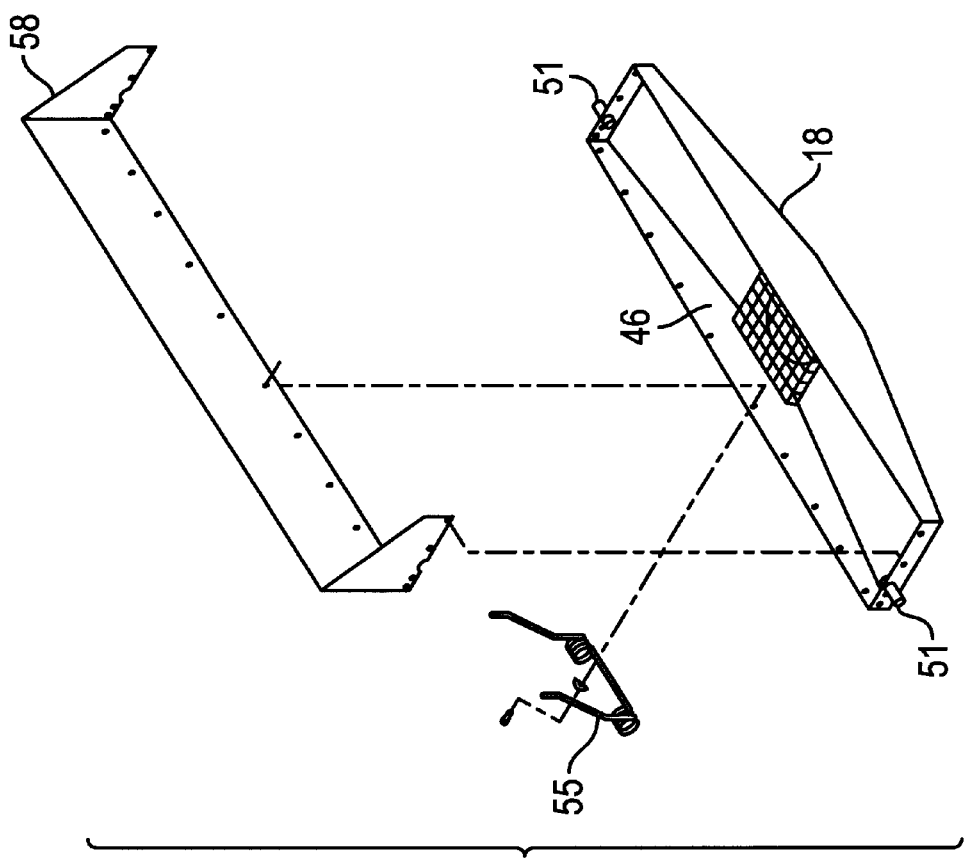
FIG. 3 shows various components of the hopper.

FIG. 3 shows various components of the hopper assembly. The hopper assembly includes the hopper 18 as previously described, pivot pins 51, a biasing device 55, and a flexible seal 58.

The pivot pins 51 pass through frame components of the tank 12, and allow the hopper 18 to pivot in a vertical plane with respect to the tank 12.

Figure 4A:
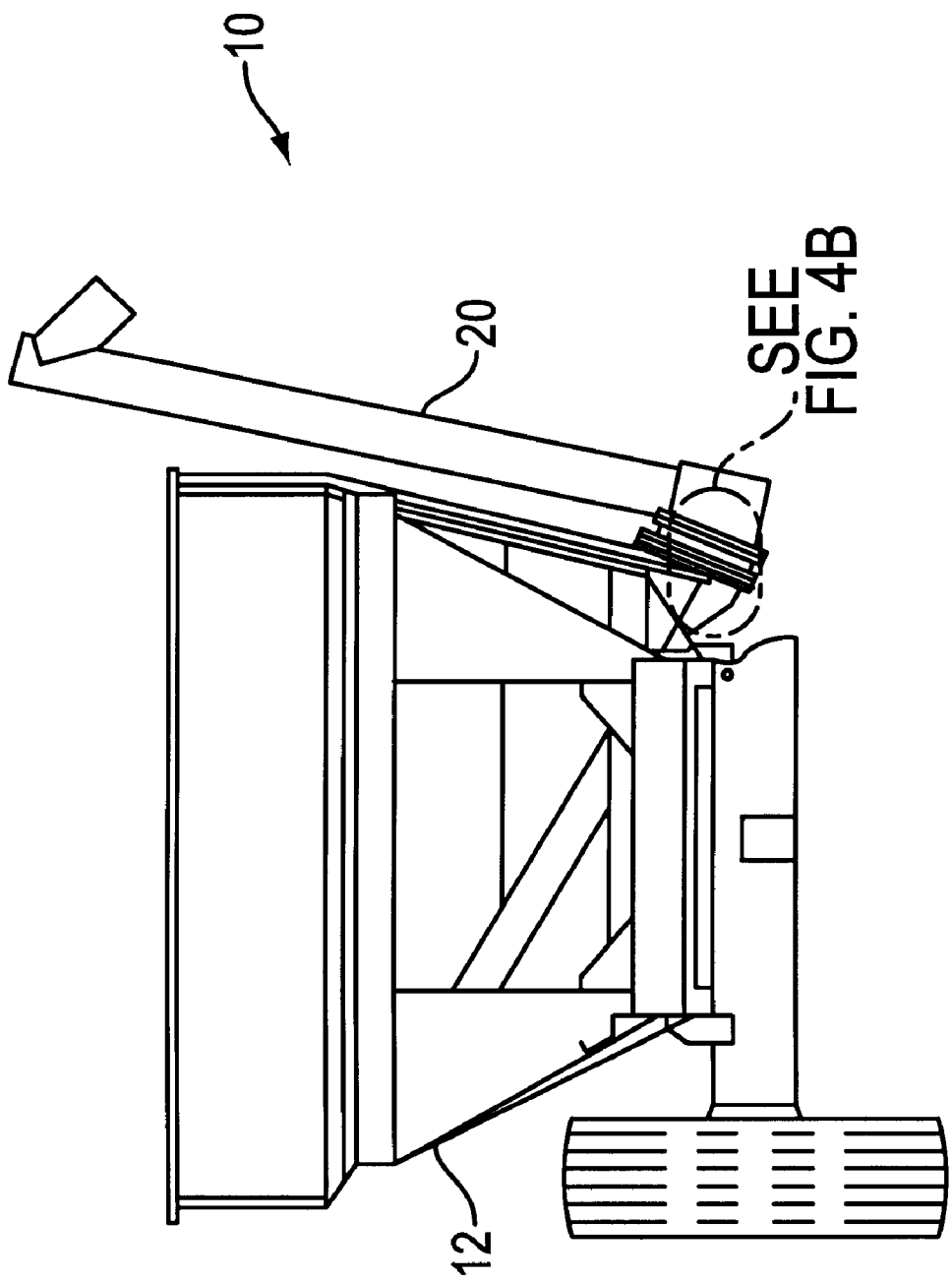
FIGS. 4A and 4B show the auger and hopper when the auger is in a maximum vertical displacement.
Figure 4B:
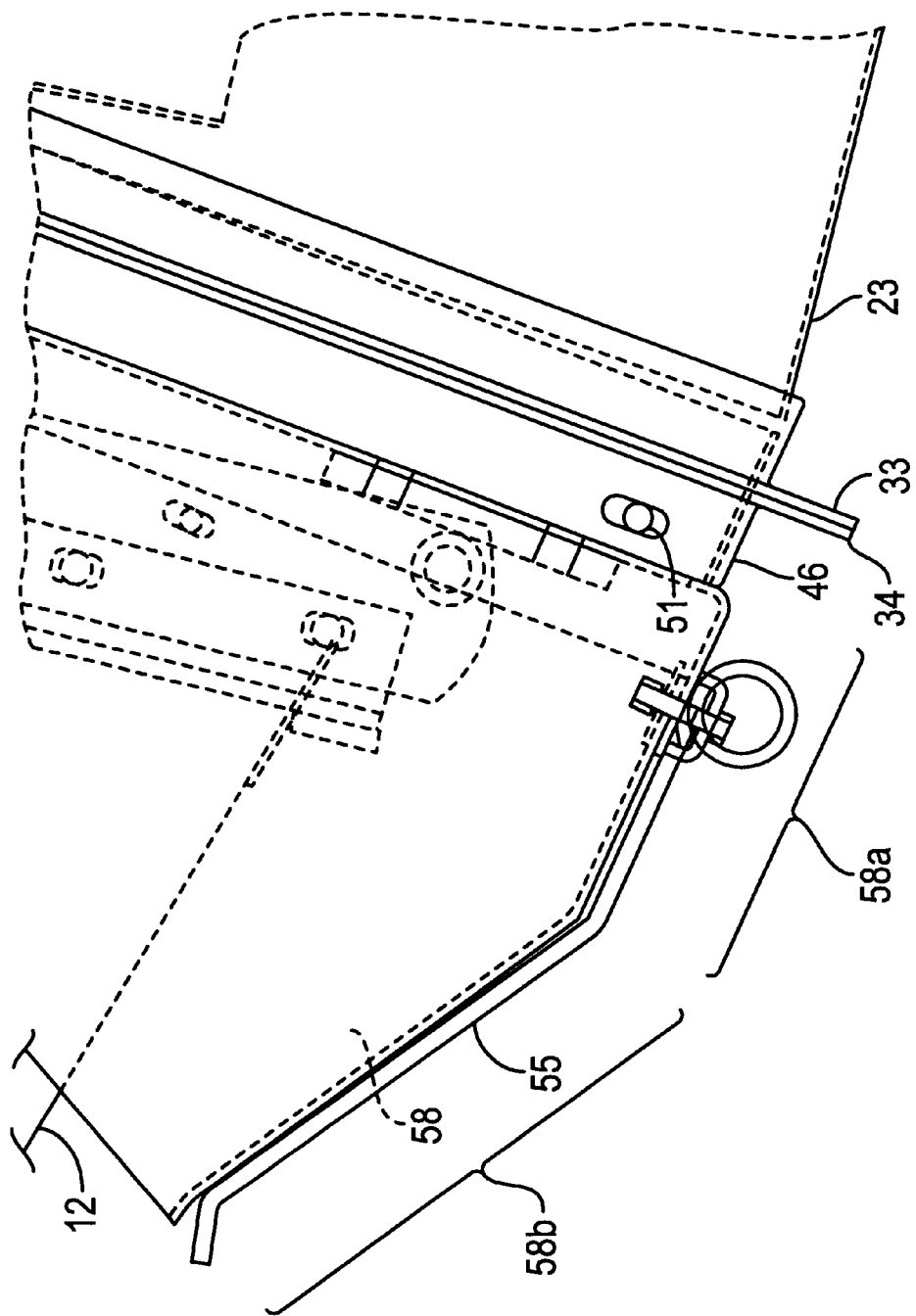
Figure 5A:
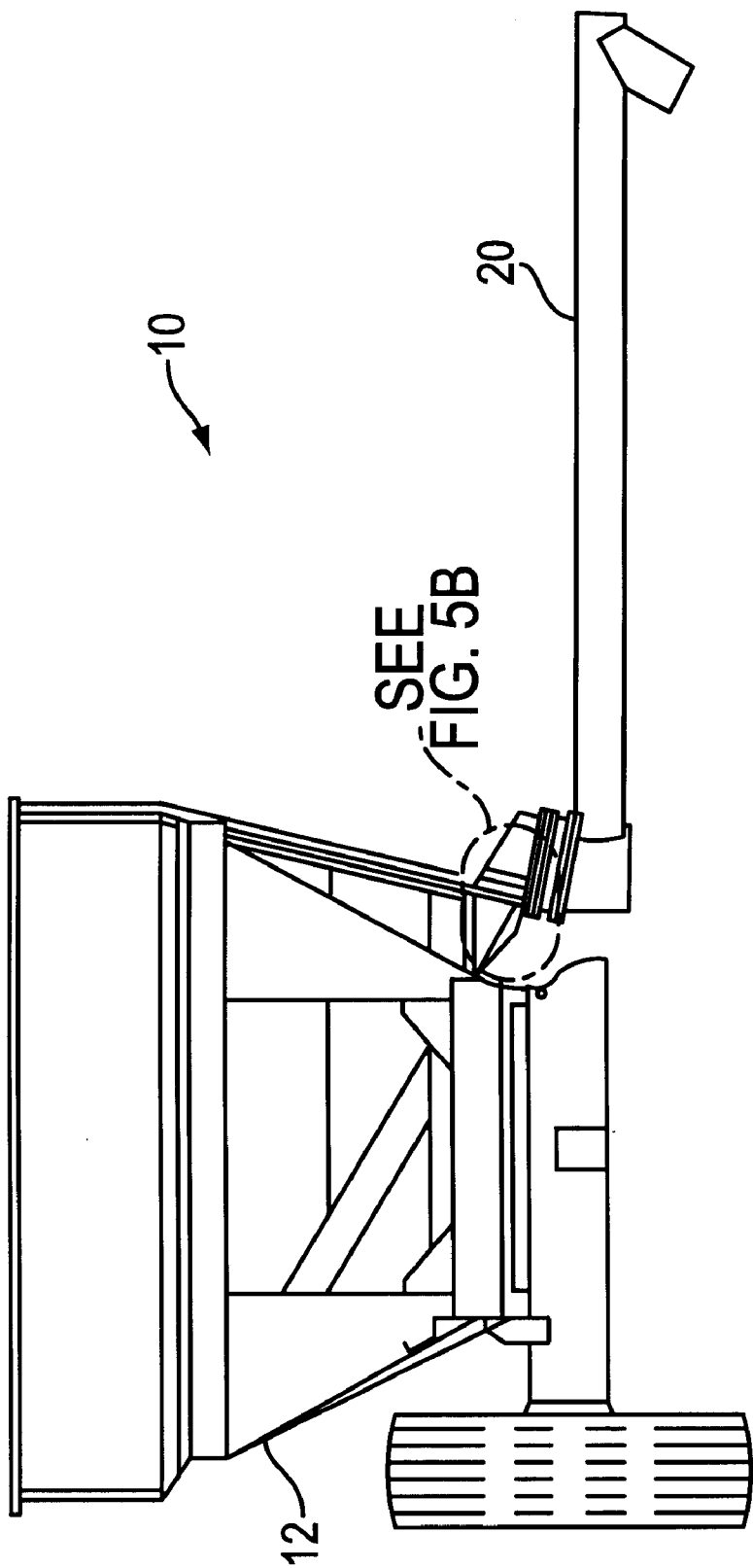
FIGS. 5A and 5B show the auger and hopper when the auger is in a substantially horizontal position.
Figure 5B:
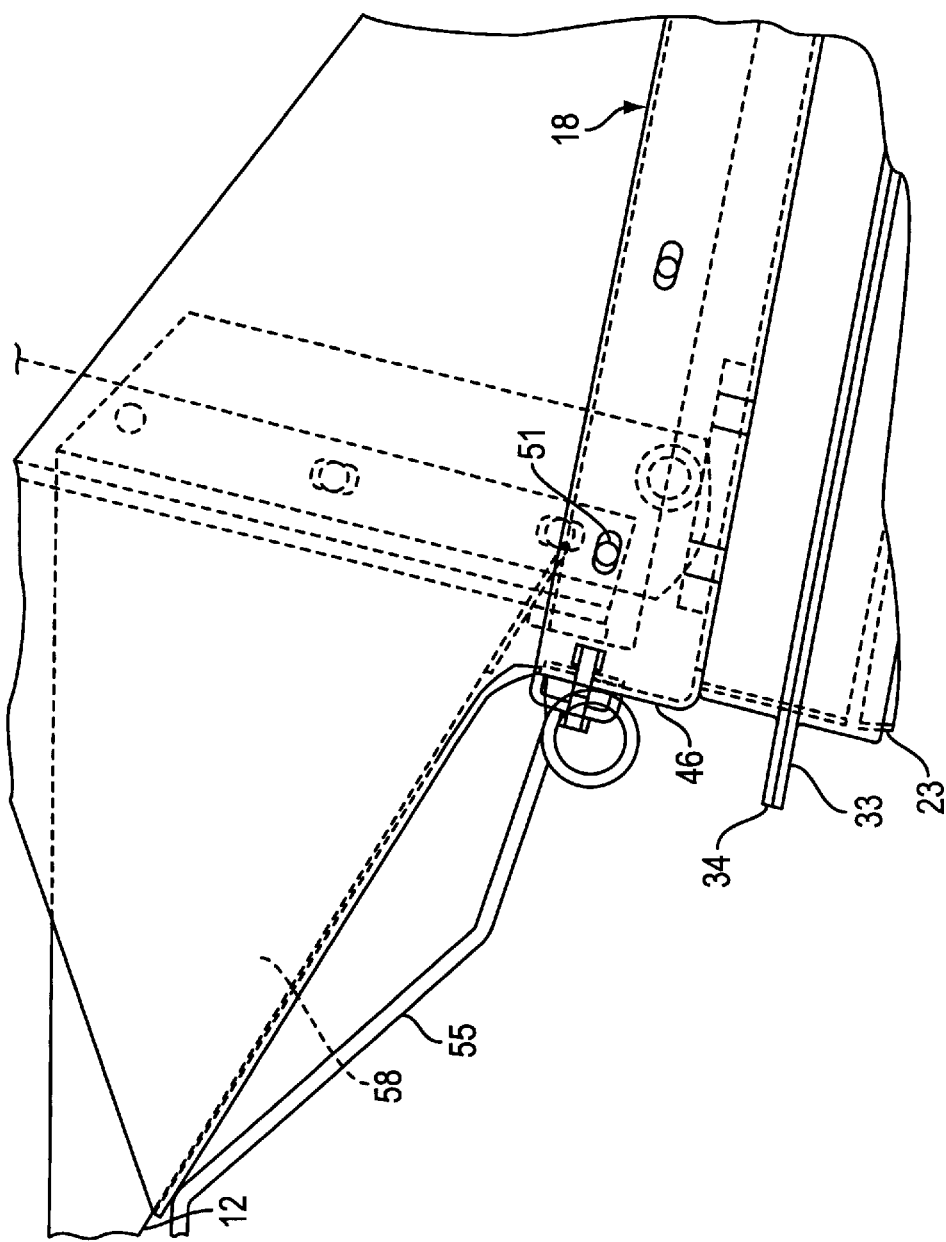

The flexible seal 58 functions to extend the rear wall 46 of the hopper 18, yet may be displaced by the bottom surface of the tank 12 when the auger 20 approaches a horizontal position (see discussion accompanying FIGS. 4B and 5B). In the preferred embodiment, the flexible seal 58 is formed of rubber, but alternatively may be formed of any suitable flexible material. Preferably, the flexible seal 58 is attached to the rear wall 46 as well as the side walls of the hopper 18.

The biasing device 55 serves to maintain the flexible seal 58 in a position co-planar with the rear edge 46 of the hopper 18 when the auger 20 is not being displaced by the bottom surface of the tank 12. In the preferred embodiment, the biasing device 55 is a metal spring having coil portions and legs, but alternatively may be any other type of biasing device including, for example, a leaf spring, a coil spring, etc. The biasing device 55 does not, however, position or bias the hopper 18 with respect to the tank 12, as the weight of the auger 20 will greatly exceed the biasing force presented by the biasing device 55.

FIGS. 4–5 show the range of motion of the vertical pivot of the auger 20 and the corresponding action of the flexible seal 58.

FIGS. 4A and 4B show the auger 20 pivoted to a fully vertical position. FIG. 4A shows an overall view (wheels are omitted for clarity), while FIG. 4B shows an enlargement of the area entitled "DETAIL A." In FIG. 4B the flexible seal 58 has lost contact with the bottom surface of the tank 12 due to the maximum vertical displacement of the auger 20. In addition, the biasing device 55 is in a relaxed state. In this position, preferably a position for transport of the wagon 10, the flexible seal 58 still retains any contents of the hopper 18 to prevent spillage and waste. As can be seen from FIG. 4B, the flexible seal 58 may include a first portion 58a that is substantially co-planar with the rear wall 46 of the hopper 18, and a second portion 58b that is canted inward towards a center of the hopper 18. The second portion 58b is an enhancement of the present invention that further aids in the prevention of spillage and waste of the contents of the hopper 18. Alternatively, the flexible seal 58 may not have an inwardly canted portion.

FIGS. 5A–5B show the auger 20 in a substantially horizontal position. FIG. 5A shows an overall view (wheels are omitted for clarity), while FIG. 5B shows an enlargement of the area entitled "DETAIL B." In FIG. 5B, the flexible seal 58 is displaced by the bottom surface of the tank 12 due to the substantially horizontal position of the auger 20. By comparing FIG. 5B with FIG. 4B, it can be seen that the biasing device 55 is also displaced, and must bend or flex in response to the position of the auger 20. As can be seen, the flexible seal 58 is no longer substantially co-planar with the rear wall 46 of the hopper 18.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An auger hopper and seal for a pivotable auger, comprising:

a hopper for a pivotable auger at an intake end of said auger, said hopper having a rear wall located underneath a storage tank, side walls extending from underneath said storage tank, and a front wall positioned away from said storage tank, said hopper being located below a discharge opening on said storage tank and having a hinged connection to said storage tank, wherein said hopper may be pivoted vertically with respect to said storage tank;

a flexible seal attached to said rear wall and said side walls of said hopper and positioned between said hopper and a bottom surface of said storage tank, the flexible seal being capable of being displaced by the bottom surface; and a biasing device mounted on said hopper and contacting said flexible seal and urging said flexible seal into a configuration substantially co-planar with said bottom surface;

wherein said flexible seal is capable of retaining a material contained in said hopper when said auger is elevated to a maximum vertical position.

2. The seal of claim 1, wherein said flexible seal pivots with said hopper.

3. The seal of claim 1, wherein said flexible seal is rubber.

4. The seal of claim 1, wherein said flexible seal further comprises:

a first portion co-planar with said rear wall of said hopper and attached to said rear wall; and a second portion canted inward toward a center of said hopper.

5. The seal of claim 1, wherein said storage tank is a grain tank.

6. The seal of claim 1, wherein said storage tank is mounted on a wagon.

* * * * *